United States Patent [19]

McDermott et al.

[11] 4,180,010
[45] Dec. 25, 1979

[54] MOUNT FOR VEHICULAR WARNING LIGHTS

[76] Inventors: Julian A. McDermott; Kevin McDermott, both of New York, N.Y.

[21] Appl. No.: 867,951

[22] Filed: Jan. 9, 1978

Related U.S. Application Data

[63] Continuation of Ser. No. 641,908, Dec. 18, 1975, abandoned.

[51] Int. Cl.² ............................................. B60Q 7/00
[52] U.S. Cl. .................................. 116/209; 224/321; 362/80; 362/427
[58] Field of Search ..................... 224/42.1 R, 42.1 E, 224/42.1 F; 240/7.1, 49, 57; 248/188.2; 211/1.5; 280/764; 296/100, 101, 26, 27, 23 F, 23 G, 23 H; 105/240; 116/52, 53, 54, 209

[56] References Cited

U.S. PATENT DOCUMENTS

| | | | |
|---|---|---|---|
| 3,375,365 | 3/1968 | Gross | 224/42.1 F |
| 3,579,184 | 5/1971 | Forestal | 240/57 |
| 3,596,416 | 8/1971 | Hojka | 296/27 |
| 3,709,518 | 1/1973 | Gauchet | 280/764 |
| 3,870,276 | 3/1975 | Phillips | 280/764 |

*Primary Examiner*—Joseph F. Peters, Jr.
*Assistant Examiner*—Ross Weaver
*Attorney, Agent, or Firm*—Kenyon &Kenyon

[57] ABSTRACT

Disclosed is a mount for warning lights as generally attached to the tops of vehicles. This mount provides means of holding lights on two horizontal arms on the top of the vehicle but by the rotation of the arms to a vertical position the elevation and hence the effectiveness of the lights is increased. This is accomplished with a minimum of effort but a maximum of reliability.

8 Claims, 12 Drawing Figures

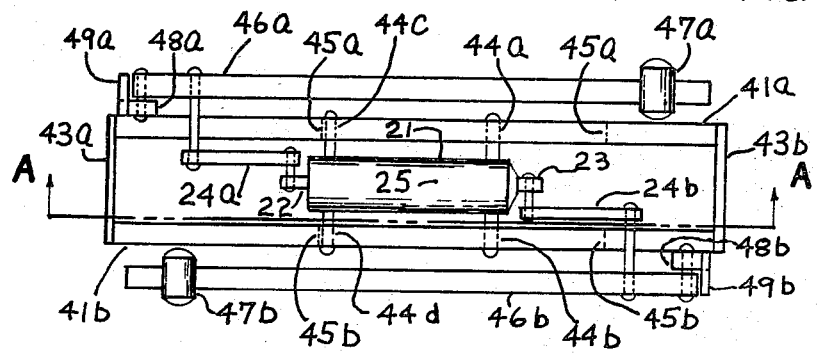
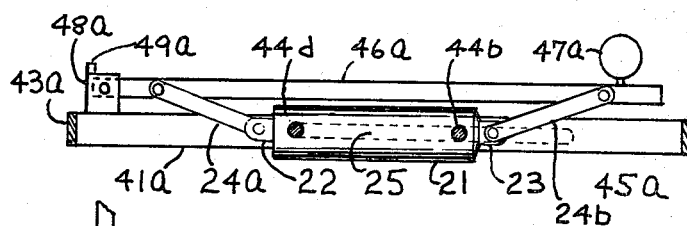
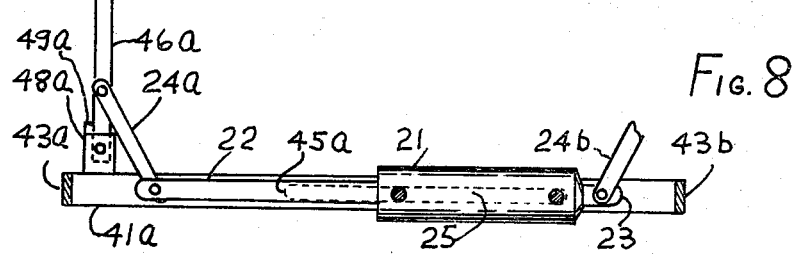
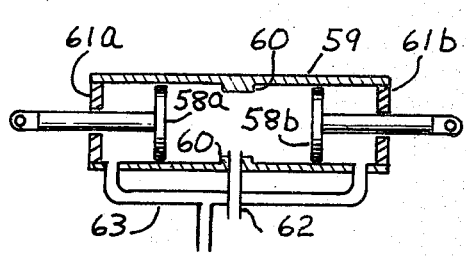
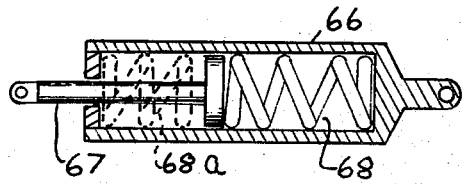

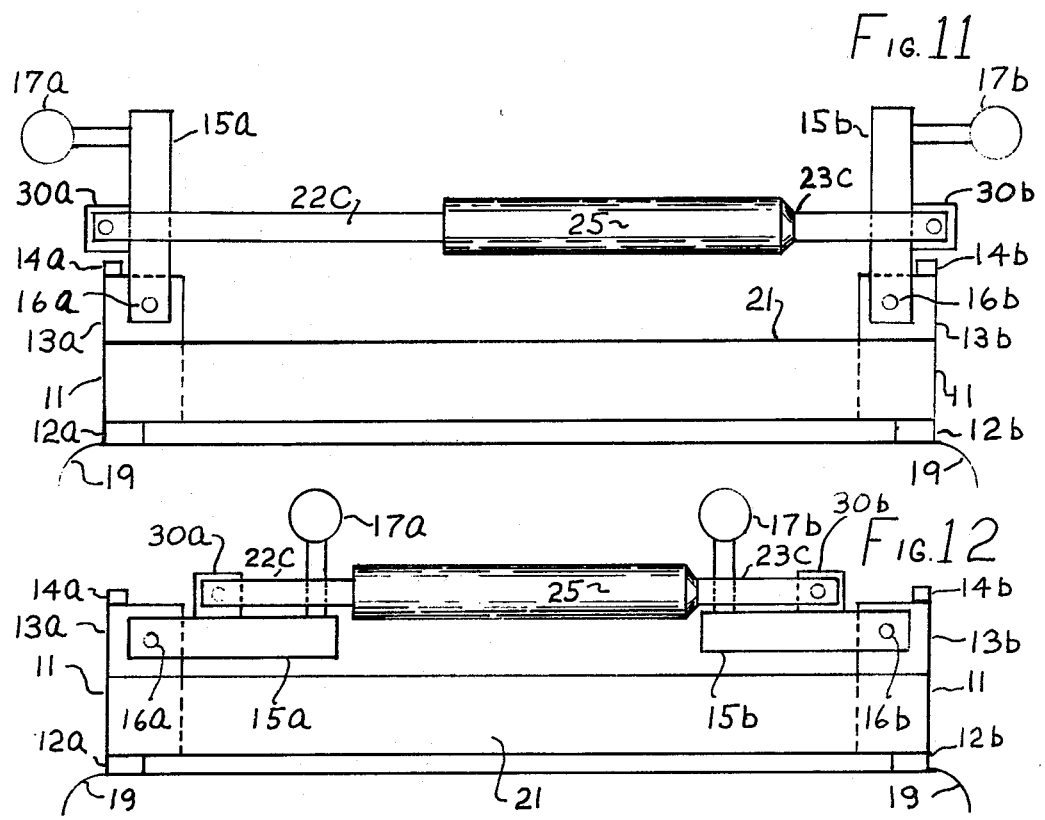

MOUNT FOR VEHICULAR WARNING LIGHTS

This is a continuation of application Ser. No. 641,908 filed Dec. 18, 1975, now abandoned.

BACKGROUND OF INVENTION

It has long been recognized that the effectiveness of warning lights as used on police and other emergency vehicles is greatly improved if their height is increased. However, it is impractical in most cases to mount them at a height. The lights are struck by trees as the vehicle moves and they can be an impediment to the speed of the vehicle itself due to wind resistance and stability.

For some time lights have been mounted on the roof of such vehicles on horizontal bars which can be raised to a vertical position carrying the lights with them. However, raising such units vertically manually is troublesome and if done in traffic could be dangerous.

This invention discloses means to raise such bars to a vertical position using power available from the vehicle and doing this simply and efficiently.

SUMMARY OF THE INVENTION

An object of this invention is to provide a new and improved method of mounting warning lights on vehicles in such a way that the level of the lights may be raised above the top of the vehicle in order to improve their visibility and thus reduce the possibility of an accident.

BRIEF DESCRIPTION OF THE DRAWINGS

FIG. 6 is a plan of a form of the device whereby longer light holding bars may be employed.

FIG. 7 is a section thru such a device with an arm shown as down.

FIG. 8 is a section thru such a device with the light holding bar shown as up.

FIG. 9 shows a pneumatic or hydraulic actuating mechanism applicable to the basic design but where the actuating mechanism is in a fixed position.

FIG. 10 shows an actuating mechanism where a spring is used as a source of power and single action only is provided.

FIGS. 11 and 12 show a variation of the embodiment of FIGS. 1, 2 and 3 in that the actuating device is not restricted in its vertical motion.

DESCRIPTION OF THE INVENTION

Figure 1:
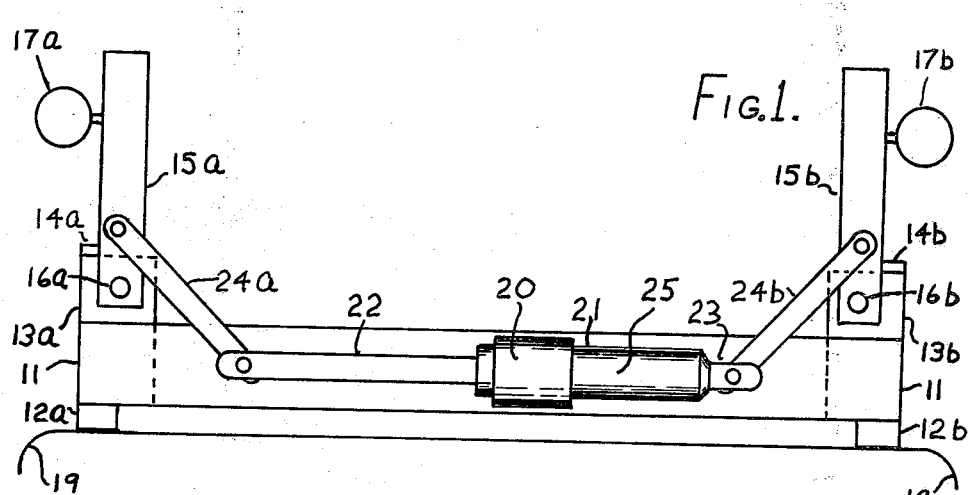
FIG. 1 is an elevation of a light unit mounted on the roof of a vehicle with the light holding bars in an up position.
Figure 2:
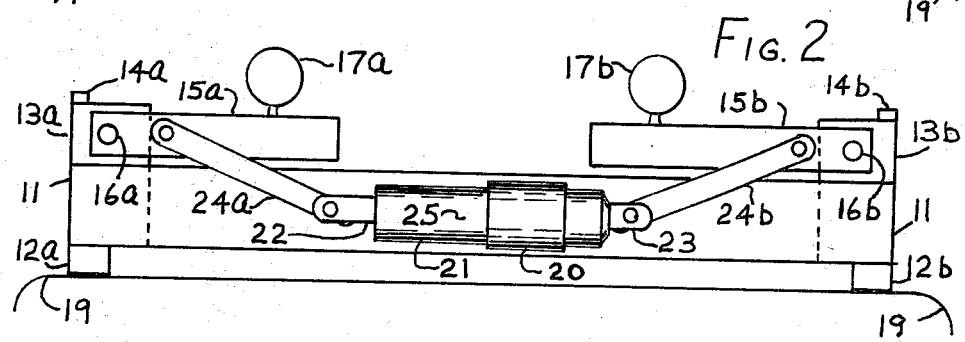
FIG. 2 is an elevation of the same lights with the light holding bars in the down position.
Figure 3:
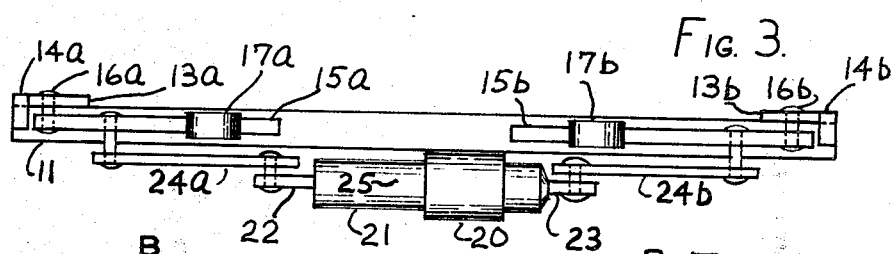
FIG. 3 shows a plan looking down on the same lights.

Referring now to the embodiments of the invention illustrated in the drawings, FIGS. 1, 2 and 3 show a form controlling two light bearing arms mounted on the top of a vehicle. In these drawings the mounting frame consists of a horizontal support member—usually a square tube 11 attached to the vehicle roof by the supports 12a and 12b. Attached to said horizontal support member are pivot plates 13a and 13b to which are attached vertical stops 14a and 14b.

Light mount bars 15a, 15b are pivoted at 16 a–16b. The lights themselves are shown as 17a and 17b. An actuator mount tube 20 is attached rigidly to the horizontal support member 11.

Freely mounted inside the mount tube 20 is the actuator 25. This would generally be a hydraulic or pneumatic cylinder and piston or a mechanical expansion cylinder actuated by gears. The source of power for such actuation could be remote or attached thereto. It would generally have to be double acting to provide both an expanding and contracting linear motion if provision is to be made to both raise and lower the arms. A spring arrangement could also serve this purpose although manual means would have to be used to bring the arms down if the spring was used to provide raising power.

The actuator's motion element that moves in linear relation to its body 21 is shown as 22. The actuator arm 23 would be fixed rigidly to the actuator body 25 itself.

A force arm 24a is connected between the motion element 22 and one of the light mount bars 15a. Another force arm 24b is pivotedly connected between arm 23 and the other light bar 15b.

In operation if the lights at the start are in a down position, as in FIG. 2, the device functions as follows:

Energy is fed into the actuator 25 causing it to expand linearly. The motion element 22 pushes against the force arm 24a which in turn tries to raise the light bar 15a. However the exertion of such a force effects a counter force which acts through arm 23 and force arm 24b upon light bar 15b.

If equally balanced frictionally and otherwise both light bars would be raised simultaneously. This is most improbable but to insure one light bar rising before the other more pivot friction or weight would be introduced into one of the light bars. Then the other bar would be the first to rise to its limit. Finally, all of the actuators energy would be used to raise the remaining bar. Even if one bar starts up and there is an impediment to its progress the remaining bar would be raised and when it reached its ultimate position all the energy of the actuator would be supplied to raise the remaining bar.

Another advantage of this construction is that if one bar is encumbered the other arm would still rise.

Still another advantage is found in that one bar is raised first-even before the full function of the device is achieved—thus providing quicker protection than if the raising of both bars was waited for.

Lowering of the bars involves the complete reversal of the described process caused by the linear contraction of the actuator.

Figure 4:
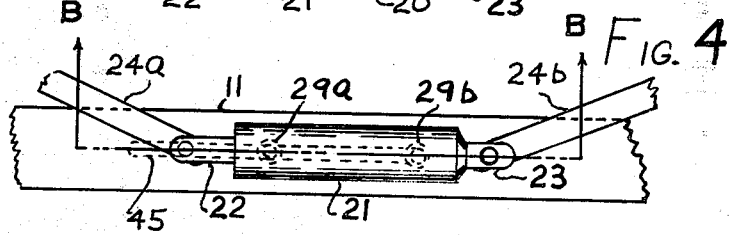
FIG. 4 shows an alternative method of mounting the actuating mechanism.

From this description it is seen that the actuator 25 must be free to move back and forth within the mount tube. However other mounting methods than that shown in FIGS. 1, 2 and 3 could be used. One such arrangement is shown in FIGS. 4 and 5.

In this design the horizontal support member 11 is slotted. Slide guides 29a and 29b are attached to the actuator body 21. The operation of the device is similar to that described for FIGS. 1, 2 and 3 except that the actuator moves back and forth controlled by the slide guides in the slot instead of the mount tube 20 shown in FIGS. 1, 2 and 3.

Figure 5:
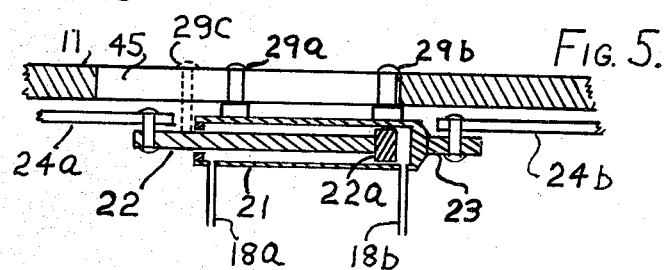
FIG. 5 shows a plan view of said alternative method of mounting the actuating mechanism.

In FIG. 5 the drawing of the actuator 25 is sectional (BB) to illustrate a typical arrangement where hydraulic or pneumatic pressure is used for action.

In these drawings 18a and 18b are the connection tubes 22 is the motion element and 22a is the piston.

The slide guides may be both mounted on the actuator body 21 or one of these shown as 29c could be mounted on the motion element 22 with a correspondingly longer slot 45.

It would be desirable to be able to raise the light to a greater height by the use of longer bars. One method of doing this is by using dual horizontal support members 41a and 41b fastened together by braces 43a and 43b of FIGS. 6 and 7.

The actuator 25 may then be located between the support members 41a and 41b and kept in position by the use of slide guides 44a, 44b, 44c and 44d fastened to the actuator body. These slide guides pass through the slots in the support members 41a and 41b via slots 45a and 45b.

The functioning of the device as illustrated in FIGS. 6, 7 and 8 is similar to the previously described form. Energy is fed into the actuator 25 causing the movement of the motion element 22. The force arm 24a is pivotedly connected to the motion element 22. In turn the force arm 24a is pivotedly connected to the light mount bar 46a holding light 47a. The effect is then an effort to raise the light bar.

As in FIG. 1 action must have reaction.

The pressure achieved in expansion by the actuator 25 results in pressure on the pivot arm 23 which is attached to the body 21 of the actuator itself.

As described for FIG. 1 the side having the least resistance will move to the limit of its path controlled here by the slots and slide guides and the movement of the other arm will follow.

In the design shown as FIG. 6 the pressure of pivot arm 22 on force arm 24a (assuming this side has the least resistance) causes the light mount bar 46a to rotate upward. When this reaches its limit of travel the pressure of the actuator is applied thru arm 23 and force arm 24b to rotate the light bar 46b and raise it.

The light bar that rises first is the one with the least resistance. The presumption that 46a rises first is made only to clarify the explanation of the operation.

FIG. 7 shows a section AA thru the dual support frame unit as shown in FIG. 6. The parts shown are as identified in FIG. 6.

FIG. 8 is an extension of this section (FIG. 7) with the illustrated light mount bar 46a raised.

In FIGS. 6, 7 and 8 the function of similarly numbered parts are equivalent to those in FIGS. 1, 2 and 3.

In all of these descriptions lowering is a reversal of the described process.

In all of the illustrations the actuator would have to provide a reciprocating effect in order to bring the light mount bars down. This is possible by a worm gear, hydraulic or pneumatic action. The reciprocating action may also be achieved by a suitably placed spring within these systems so that exterior energy is only provided on the first step such as raising.

FIG. 9 shows a section thru a pneumatic or hydraulic actuator applicable to the basic systems illustrated in FIGS. 1 to 6 but with the actuator cylinder 59 attached firmly to the support frame instead of sliding back and forth guided by mount tube 20 FIGS. 1 and 2 or guide slots 45a and 45b.

In this drawing two actuating pistons 58a and 58b (or motion elements) operate in a cylinder 59. 60 indicates the interior pistons' stops while 61a and 61b represent the cylinder end closures.

In operation liquid or air pumped into the cylinder thru tube 62 (exhausted thru 63) brings pressure on the pistons 58a and 58b.

Either or both pistons may move and these pistons would be coupled to the force arms 24a and 24b (FIG. 1) and the lights 17a and 17b (FIG. 1) would be raised.

The stops 60 would insure return of the pistons and hence the light bars to their former position when liquid or air was pumped into the end sections of the cylinder thru tube system 63 and exhausted thru 62. Of course, springs could substitute for one of the actuating sources of pressure to return the pistons to their original position.

All of the actuators provide linear expansion as a means of operation. A spring may substitute to provide the expansive force. However the return of the light mount bars to their "down" position would then have to be mechanically or manually achieved. FIG. (10) shows an actuator using a spring. In this drawing 66 is the cylinder, 67 is the piston—motion element and 68 is the actuators spring. This is a substitution for the other actuator illustrated herein. If it is desired to have the spring force the arms down instead of up it would be located on the other side of the piston as shown as 68a.

In all of the light bar raising systems illustrated the linear action is translated to the swiveling of the light bars about their pivots. Individual bars may be raised by using the basic principles. Thus in FIG. 7 if the actuator body 21 were fixed to the support 41a instead of floating in the slots the movement of the motion element 22 would result in the raising of the light bar 46a. However, only one light bar could be raised by the linear action and twin or double actuators would have to be used to raise two arms.

In the systems for raising the bars shown in FIGS. 1 to 3 inclusive and 6 to 8 inclusive the linear actuator is not in itself raised. It is retained in its height position on the vehicle by the sleeve 20 in the first case and the slide guides 44a, b, c and d in the second. This was done to prevent the actuator from rising and interferring with other lights on the vehicles' roof.

Where such interference is not objectionable the sleeve or slide guides may be dispensed with and the actuator may be coupled directly to the light bars.

FIGS. 11 and 12 are similar to FIGS. 1 and 2 and the identification of the parts is similar. However the position retaining means for the linear actuator tube 20 FIG. 1 is not used.

The actuator 25 raises as it forces the light bars 15a and 15b up. Pivot blocks which function as force arms attached to the light bars whereat pivoting occurs are illustrated as 30a and 30b.

As in FIG. 1 actuator arm 23c is a part of the actuator body and 22c is the motion element.

For clarity the drawings No. 11 and 12 are shown. However the same effect could be achieved by making the pivot connections between parts 24a and 22 and 23 and 24b solid on FIGS. 1, 2 and 3 eliminating the tube 20 and adding the pivot blocks as on FIG. 11, 30a and 30b.

Where the actuator is pneumatically or hydraulically actuated as in FIG. 9 the linear actuator even if equipped with two pistons would have a common expansion chamber or if separate expansion chambers are to be used for each piston they must be connected together so that they are in effect a single chamber, so that the light with the least resistance rises first.

Wherever in this application the actuator is free to move and is not clamped to the support frame the force to raise the light support members results from pressure transmitted between the said light support bars, that is from one said light support bar to the other.

There has thus been shown and described a Mount for Vehicular Warning Lights, in the best known form of its embodiment and in several modifications thereof. It is to be understood that the foregoing is to be regarded as illustrative and descriptive only of the best known forms of the present invention and not as limitative or restrictive to the exact details shown, applicant reserving the right to make changes and modifications in the present invention as come within the scope of the appended claims without thereby departing either from the spirit or scope of the present invention.

Having thus described the invention, what is claimed as new and desired to secure by Letters Patent, is:

1. In combination,
    a mounting frame for mounting on a roof of a vehicle;
    a pair of light mount bars, each said bar being pivotally mounted at an end thereof to said mounting frame;
    an actuator for pivoting said mount bars between a horizontal position and a vertical position relative to said frame, said actuator having a body, a motion element mounted in said body for relative linear motion to one side of said body, and an arm connected to said body on a side opposite said one side;
    a first force arm pivotally connected to said motion element and one of said mount bars; and
    a second force arm pivotally connected to said actuator arm and the other of said mount bars.
2. The combination as set forth in claim 1 which further includes a mount tube rigidly attached to said mounting frame and wherein said actuator body is freely mounted inside said mount tube.
3. The combination as set forth in claim 1 wherein said mount bar is of a length substantially equal to the width of said mounting frame.
4. The combination as set forth in claim 1 which further comprises stop means on said mounting frame to limit travel of said mount bars to said vertical position.
5. The combination as set forth in claim 1 wherein said actuator is hydraulically actuated.
6. The combination as set forth in claim 1 wherein said mount bars are mounted to pivot towards each other when moving from said vertical position to said horizontal position.
7. The combination as set forth in claim 1 wherein each said force arm is a pivot block attached to a respective light mount bar.
8. In combination,
    a mounting frame for mounting on a roof of a vehicle;
    a pair of light mount bars, each said bar being pivotally mounted at an end thereof to said mounting frame;
    a double-acting actuator fixedly mounted to said mounting frame for pivoting said mount bars between a horizontal position and a vertical position relative to said frame, said actuator having one motion element mounted therein for relative linear motion to one side of said body, and a second motion element mounted therein on a side opposite said one side;
    a first force arm pivotally connected to said one motion element and one of said mount bars; and
    a second force arm pivotally connected to said second motion element and the other of said mount bars.

* * * * *